A. Merrell,
Percolator.
No. 104,181.  Patented June 14, 1870.
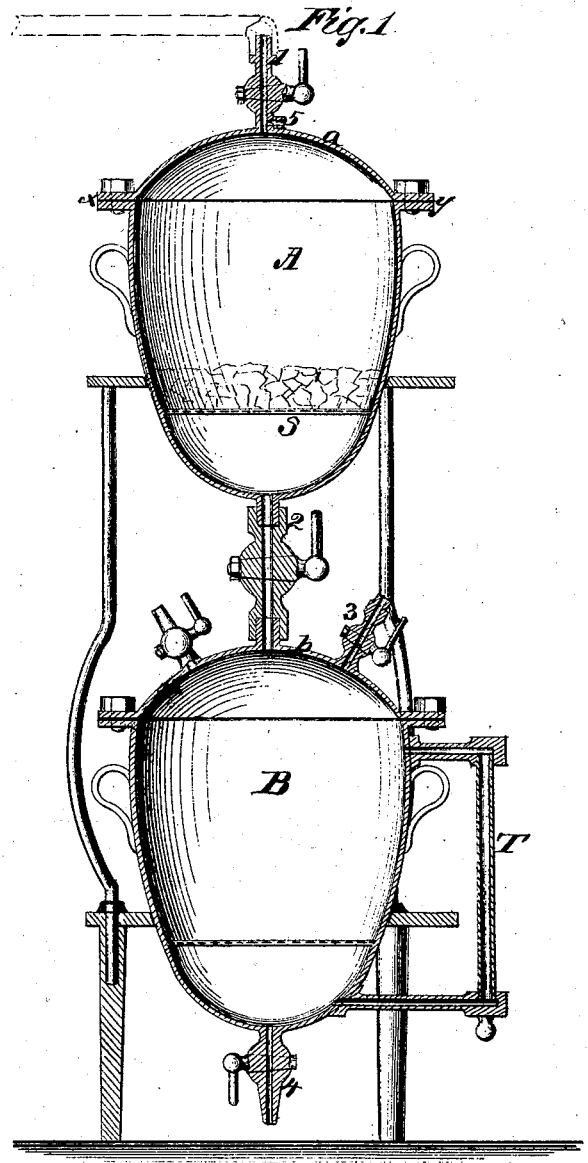
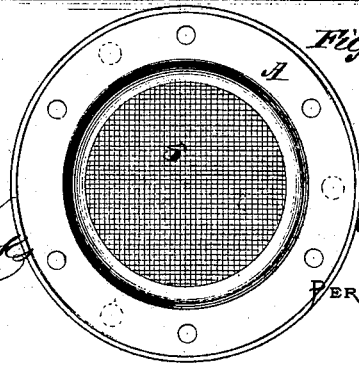

UNITED STATES PATENT OFFICE.

ALBERT MERRELL, OF CINCINNATI, OHIO.

IMPROVEMENT IN PERCOLATORS FOR DRUGGISTS AND OTHERS.

Specification forming part of Letters Patent No. 104,181, dated June 14, 1870.

*To all whom it may concern:*

Be it known that I, ALBERT MERRELL, of Cincinnati, in the county of Hamilton and State of Ohio, have invented certain Improvements in the Pharmaceutical Apparatus known as "Percolators;" and I do hereby declare that the following is a full, clear, and exact description thereof, which will enable others skilled in the art to make and use the same, reference being had to the accompanying drawings, forming part of this specification.

The invention relates to percolators; and it consists in a combination of parts to form an improved apparatus, as will be fully specified in the claim.

Figure 1 is a sectional elevation, and Fig. 2 is a horizontal section.

Similar letters of reference indicate corresponding parts.

A is a conical or cylindrical vessel, made of strong copper or other suitable material, having an arched or conical cover, a, bolted onto A by means of flanges and bolts, the said flanges being packed with a gasket, $xy$, the said vessel having air-tight cocks 1 and 2, with tubular couplings for coupling with hose or other cocks.

B is a vessel of similar material, consisting of cover and body connected with bolts and flanges, as in A, and provided with air-tight cocks at 3 and 4, and a tubular coupling at 2 connecting it with A. A tube connects at 3 with the exhaust side of an ordinary air-pump.

S is a perforated septum, such as is usually placed at the bottom of percolators.

T is a tube, graduated to show the height of liquid in B.

In using, the substance to be percolated, suitably powdered, is closely packed in the vessel A as for percolation in an ordinary percolator. The covers being tightly bolted on and the cocks at 1 and 4 closed, the air is exhausted from the whole apparatus. The cock 2 is closed and the cock 1 opened and the percolating liquid allowed to flow into the vessel A by means of a tube connecting with another vessel containing the liquid. After digesting a suitable length of time the cock 2 is opened, and the liquid is thus drawn down into the receiver, being displaced by a fresh portion of liquid, which flows in at the cock 1 as fast and no faster than the first portion passes into the receiver. After a sufficient quantity of liquid has flowed in at 1, if it is desired to still further hasten the process of percolation, air is pumped in at 5 until any desired pressure is produced. The expansion of this compressed air, together with the suction from the vacuum below, causes a still more rapid flow of liquid.

It is believed that in this apparatus all substances to which the process of percolation is adapted can be exhausted of their strength when in a finer state of division, and more closely packed than would be possible in the ordinary way, and consequently with less loss of the percolating liquid and with greater rapidity than by any other apparatus.

Having thus described my invention, I claim as new and desire to secure by Letters Patent—

The oval vessels A B—one a percolator and the other a receiver—having arched covers with air-tight cocks, perforated septum, tubular couplings, and graduated tube T, all connected, constructed, and combined together as and for the purpose described.

ALBERT MERRELL.

Witnesses:
H. P. BELKNAP, Jr.,
L. E. MILLS.